(12) United States Patent
Church et al.

(10) Patent No.: US 10,241,321 B1
(45) Date of Patent: Mar. 26, 2019

(54) MONOLITHIC ADAPTIVE OPTICAL/RF REFLECTOR

(71) Applicant: SCIPERIO, INC, Orlando, FL (US)

(72) Inventors: Kenneth H. Church, Orlando, FL (US); Paul Deffenbaugh, Orlando, FL (US); Josh Goldfarb, Melbourne, FL (US); Charles Michael Newton, Orlando, FL (US); Michael W. Owens, Orlando, FL (US); Will Stone, Orlando, FL (US); Casey Perkowski, Orlando, FL (US)

(73) Assignee: Sciperio, Inc, Orlando, FL (US)

( * ) Notice: Subject to any disclaimer, the term of this patent is extended or adjusted under 35 U.S.C. 154(b) by 0 days.

(21) Appl. No.: 15/147,714

(22) Filed: May 5, 2016

Related U.S. Application Data (60) Provisional application No. 62/157,737, filed on May 6, 2015.

(51) Int. Cl.
  *G02B 5/08* (2006.01)
  *G02B 26/08* (2006.01)
  *H01Q 15/16* (2006.01)

(52) U.S. Cl.
  CPC ....... *G02B 26/0825* (2013.01); *G02B 5/0808* (2013.01); *H01Q 15/16* (2013.01)

(58) Field of Classification Search
  CPC .. G02B 5/09; G02B 26/0825; G02B 26/0816; G02B 5/0808; G02B 26/0833; G02B 27/0068; G02B 17/002; G02B 26/0841; G02B 26/0858; G02B 5/085; G02B 19/0042; G02B 7/183; G02B 7/181; H01Q 15/161

USPC ....... 359/846, 848, 849, 850, 851, 855, 862, 359/863, 866, 868, 869, 871
See application file for complete search history.

(56) References Cited

U.S. PATENT DOCUMENTS

| | | | | |
|---|---|---|---|---|
| 5,986,795 | A * | 11/1999 | Chapman | G02B 26/06 359/224.1 |
| 7,125,129 | B2 * | 10/2006 | Oshima | G02B 7/183 359/849 |
| 8,808,059 | B1 * | 8/2014 | David | G01B 11/0625 451/5 |
| 2003/0147161 | A1 * | 8/2003 | Shiraishi | G02B 7/182 359/846 |
| 2005/0017598 | A1 * | 1/2005 | Zettl | B82Y 10/00 310/309 |

(Continued)

OTHER PUBLICATIONS

"Truss," Oxford Dictionaries, <https://en.oxforddictionaries.com/definition/truss>, Dec. 5, 2017.*

(Continued)

*Primary Examiner* — Jade R Chwasz
(74) *Attorney, Agent, or Firm* — Goodhue, Coleman & Owens, P.C.

(57) ABSTRACT

A reflector assembly includes a monolithic and adaptive reflector having a single and continuous reflecting surface and a focusing shape. The reflector assembly further includes a plurality of trusses for supporting the monolithic and adaptive reflector and a plurality of actuators, each of the plurality of actuators operatively connected to one of the plurality of trusses. Actuation of each of the plurality of actuators exerts a force which flexes at least a portion of the continuous reflecting surface.

17 Claims, 6 Drawing Sheets

(56) References Cited

U.S. PATENT DOCUMENTS

| 2007/0297042 A1* | 12/2007 | Bifano | G02B 5/122 |
| | | | 359/318 |
| 2009/0277440 A1* | 11/2009 | Angel | C03B 23/0256 |
| | | | 126/601 |
| 2011/0159783 A1* | 6/2011 | Fukushima | B24B 37/042 |
| | | | 451/11 |

OTHER PUBLICATIONS

The Amazing Anatomy of James Webb Space Telescope Mirrors, https://plus.google.com/+NASAWebbTelescope/posts/253yYjBEtck, Mar. 20, 2014.

\* cited by examiner

MONOLITHIC ADAPTIVE OPTICAL/RF REFLECTOR

PRIORITY STATEMENT

This application claims priority to U.S. Provisional Patent Application No. 62/157,737 filed May 6, 2015, hereby incorporated by reference in its entirety.

FIELD OF THE INVENTION

The present invention relates to reflectors. More particularly, but not exclusively, the present invention relates to monolithic adaptive optical/RF reflectors and methods, system, and apparatus associated with manufacturing the same.

BACKGROUND

Adaptive optics is used to correct wavefront distortions from variances of light collected on a surface. This is done with a large number of highly polished mirrors that are mounted on a single structure with each mirror connected to motors that will typically pan and tilt. Large arrays of these require a large number of motors to precisely move each mirror to a specified location for focus. This is a version of a deformable mirror which can correct aberrations by controlling the wavefront of incoming light. This has proven to work, however there are a number of discontinuities that will reduce the efficiency of light collection. The current state of the art approach for deformable mirrors is to make an array of mirrors which is a digital approach. A non-digital approach would be continuous and would enable a higher efficient approach to light collection. A large single mirror would be more efficient if it could be manufactured in tolerance and then stay in tolerance through changing temperature and humidity changes. This would be a very expensive mirror.

SUMMARY

Therefore, it is a primary object, feature, or advantage of the present invention to improve over the state of the art.

It is a further object, feature, or advantage of the present invention to provide for reflectors which are efficient.

It is a still further object, feature, or advantage of the present invention to provide for a non-digital approach to light/RF collection which is continuous.

Another object, feature, or advantage of the present invention is to manufacture a large single reflector intolerance.

Yet another object, feature, or advantage of the present invention is to provide a large single reflector which stays in tolerance through changing temperature and humidity changes.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, a reflector assembly includes a monolithic and adaptive reflector having a single and continuous reflecting surface and a focusing shape. The reflector assembly further includes a plurality of trusses for supporting the monolithic and adaptive reflector and a plurality of actuators, each of the plurality of actuators operatively connected to one of the plurality of trusses. Actuation of each of the plurality of actuators exerts a force which flexes at least a portion of the continuous reflecting surface.

According to another aspect, a method of manufacturing a reflector assembly, the method includes providing a reflector with a continuous reflecting surface and a focusing shape and a plurality of trusses for supporting the reflector, coating the reflecting surface with a reflective coating, and operatively connecting a plurality of actuators to the plurality of trusses such that actuation of one or more of the plurality of actuators exerts a force which flexes at least a portion of the continuous reflecting surface.

DETAILED DESCRIPTION

Figure 1:
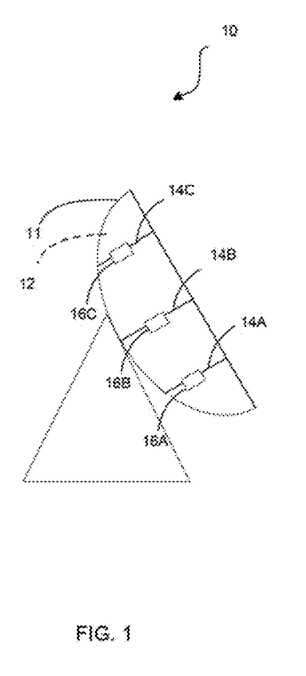
FIG. 1 illustrates a reflector with a single and continuous polished surface that can flex with motor actuation and which includes actuators on trusses.

FIG. 1 illustrates one embodiment of the present invention. A system 10 is shown in FIG. 1. According to one aspect, the present invention adds motors with motion on various places on the trusses to slightly move the truss. The dish or mirror is made from a composite material that is rigid over a large area, but small flex is permitted. The composite is coated with a highly reflective surface for both optical and RF properties. As shown in FIG. 1, a dish or mirror 11 is shown which is made from a composite material that is rigid over a large area, but small flex is permitted. The composite may be coated with a highly reflective surface 12 for both optical and RF properties. The dish or mirror 11 is supported by trusses 14A, 14B, 14C. There are actuators such as motors 16A, 16B, 16C associated with or operatively connected at or to the trusses 14A, 14B, 14C. Other types of actuators may also be used. The number of motors are determined by the number of actuation points needed. These can be slightly moved or more aggressive motion may be performed. Each motor will actuate a specific are of the mirror. Thus, for example, as shown in FIG. 1, a first motor 16A actuates a first area, a second motor 16B actuates a second area, and a third motor 16C actuates a third area of the dish or mirror 11. The actuators or motors 16A, 16B, 16C may be of different types (for example actuator 16A may be a ball screw with encoder feedback, actuator 16B may be a nano tape scale motor). One or all of the motors 16A, 16B, 16C can be moved at one time. A closed loop system is implemented to allow the mirror 11 to flex and tune in real time. The closed loop control system may be use information such as temperature or humidity to assist in controlling the system to improve efficiency.

Figure 2:
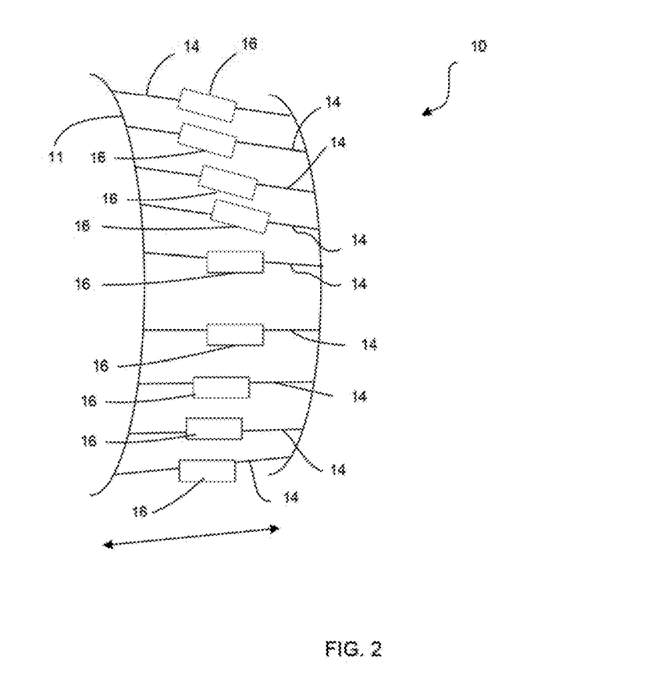
FIG. 2 is a pictorial representation of a side view of a reflector with a single and continuous polished surface that can flex with motor actuation and which includes actuators on trusses.
Figure 3:
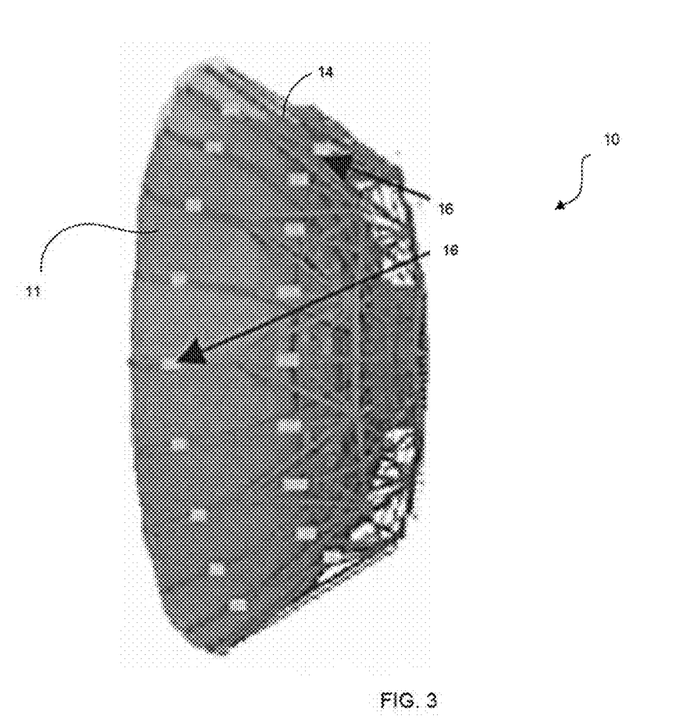
FIG. 3 is a representation of a reflector with a more complex structure.

FIG. 2 is pictorial representative of a side view of a system 10 including a monolithic dish reflector 11. Various trusses 14 and motors 16 are shown. A range of motors that drive actuation can be utilized. These motors range from ball screw with encoder feedback to more complex nano tape scale motors. The more complex motors provide nanometer resolution in movement. FIG. 3 is a pictorial representation with another example of a dish reflector 11 which includes a more complex structure with numerous trusses and motors. The shape of the reflector 11 could be parabolic or any focusing shape. Where the reflector is parabolic in X and Y dimensions it may be a symmetrical bowl/circle. A parabola in just an X dimension but not a Y dimensional or cut off in the Y dimension may also be used. Of course, any number of other focusing shapes may be used.

Figure 4:
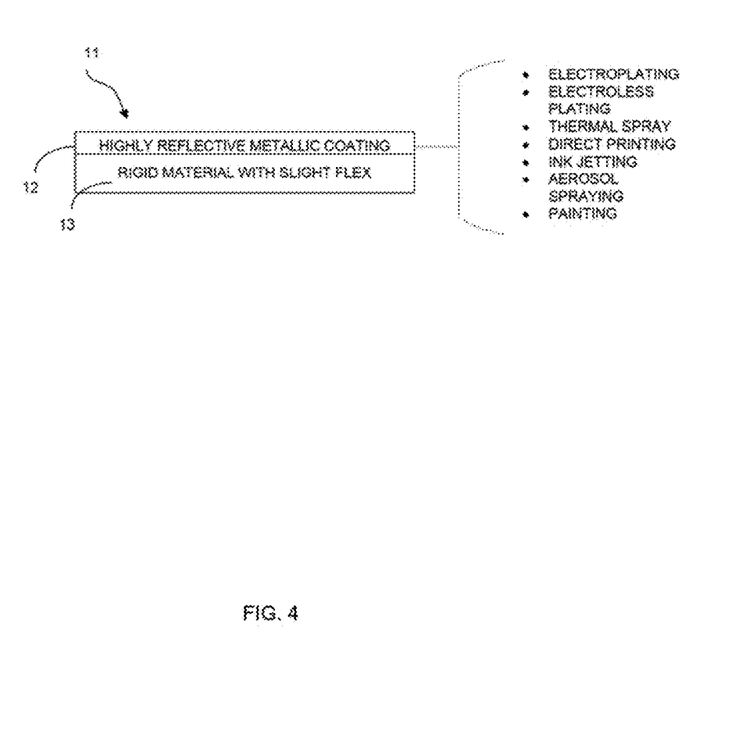
FIG. 4 illustrates a surface of reflector with a highly reflective coating which is polished.

FIG. 4 illustrates a cross-section of the mirror 11. The material for the mirror 11 could be any rigid material 13 that will slightly flex such as carbon composite. Once the structure and shape of the reflector is made, it is coated with a highly reflective metallic coating 12. This can be done in a number of ways to include electroplating, electroless plating, thermal spray, direct printing (micro-dispensing), ink jetting, aerosol spraying or painting. Highly reflective material such as copper works well for a broad range of the light spectrum from near UV to near IR. In addition, copper also is a good electrical conductor as well for RF requirements.

Figure 5:
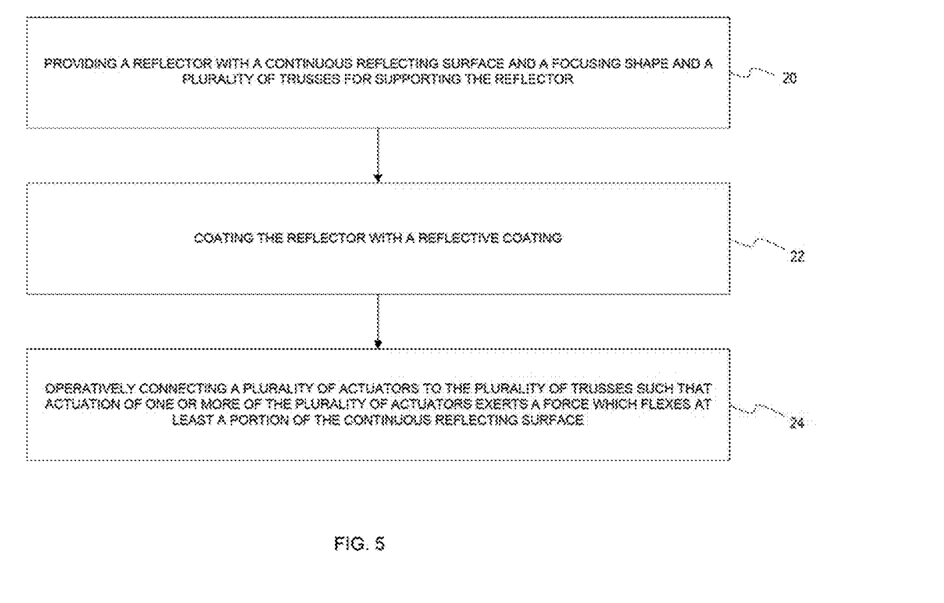
FIG. 5 illustrates one example of a method.

FIG. 5 illustrates one example of a method. In step 20, the method includes providing a reflector with a continuous reflecting surface and a focusing shape and a plurality of trusses for supporting the reflector. In step 22, the reflector is coated with a reflective coating. Once the mirror is coated, it may need to be polished, this can be done utilizing real-time in situ metrology measurement approaches from laser, light, confocal or imaging techniques, coupled with large area polishing and high resolution or localized polishing using standard mechanical approaches, but also laser polishing and localized shaping is also an option. In step 24, the method provides for operatively connecting a plurality of actuators to the plurality of trusses such that actuation of one or more of the plurality of actuators exerts a force which flexes at least a portion of the continuous reflecting surface.

Figure 6:
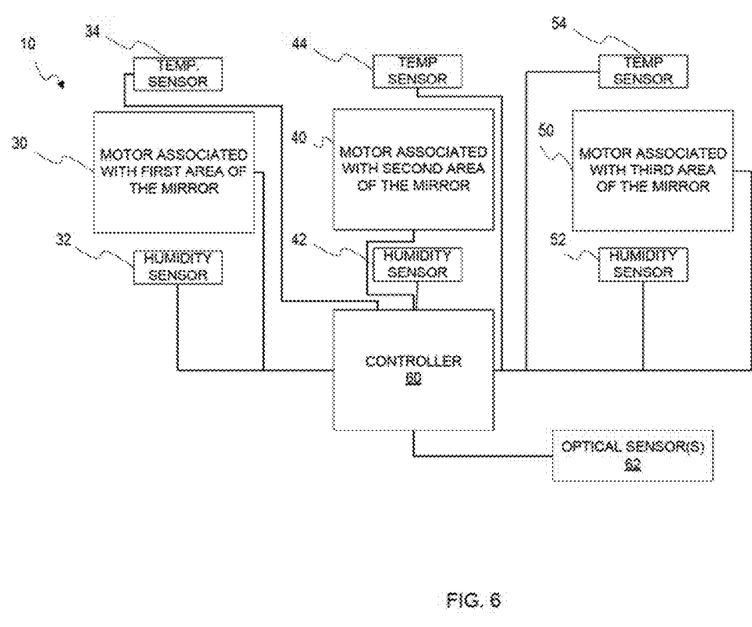
FIG. 6 illustrates one example of a system which includes a controller and sensors.

FIG. 6 illustrates one example of the system 10 including a control system. The control of the mirror may be performed in various ways. Temperature sensors 34, 44, 54 and humidity sensors 32, 42, 52 or other environmental sensors may be used as input to assist in determining which of the actuators should be actuated or not actuated in order to maximize efficiency of the reflector. Other sensors may also be used including optical sensors 62 to detect signal level. Sensors 62 may be used to scan distance, shape, or optical fringes utilizing interferometric approaches.

Although various examples and embodiments have been shown and described herein, the present invention contemplates numerous options, variations, and alternatives. The present invention is not to be limited to the specific embodiments shown and described herein. In particular variations in the shape of the reflector, whether the reflector is used for light or radio frequency (RF) signals, the number, shape, and configurations of trusses and other support structures, the number and placement of actuators, the type or types of actuators used, the type of material used for the reflector, the properties of the material used for the reflector, the type of material used for coating the mirror or reflecting surface, whether the material is polished, the manner in which the polishing is performed, and the control system used to control the actuators.

What is claimed is:

1. A reflector assembly comprising:
   a monolithic and adaptive reflector having a single and continuous reflecting surface and a focusing shape and having an opposite surface;
   a plurality of trusses arranged to support the monolithic and adaptive reflector and attached directly to the opposite surface thereof;
   a plurality of actuators, each of the plurality of actuators attached to one of the plurality of trusses, each of the actuators including a motor;
   wherein actuation of each of the plurality of actuators exerts a force which moves a corresponding one of the plurality of trusses and thereby flexes at least a portion of the continuous reflecting surface with the force exerted on a corresponding one of the plurality of trusses;
   a controller electrically connected to the plurality of actuators and configured to control the plurality of actuators; and
   a temperature sensor operatively coupled to the controller and inputting temperature data to the controller so the monolithic and adaptive reflector stays in tolerance through changing temperature.

2. The reflector assembly of claim 1 wherein the reflector is a parabolic reflector.

3. The reflector assembly of claim 1 wherein the reflecting surface is a polished surface.

4. The reflector assembly of claim 3 wherein the polished surface is polished using real-time in situ metrology measurements.

5. The reflector assembly of claim 1 wherein the motors include a ball screw with encoder feedback.

6. The reflector assembly of claim 1 wherein the motors include a nano tape scale motor.

7. The reflector assembly of claim 1 wherein the motors include a motor with nanometer resolution in movement.

8. The reflector assembly of claim 1 wherein the monolithic and adaptive reflector comprises a material which slightly flexes and is coated with reflective coating.

9. The reflector assembly of claim 8, wherein the reflective coating is a metallic coating.

10. The reflector assembly of claim 9 wherein the reflective coating is applied by a process selected from a set consisting of electro plating, electroless plating, thermal spraying, direct printing, micro-dispensing, ink jetting, aerosol spraying, and painting.

11. The reflector assembly of claim 9 wherein the metallic coating comprises copper.

12. The reflector assembly of claim 8 wherein the material comprises a carbon composite.

13. The reflector assembly of claim 1 wherein the reflector is a monolithic dish reflector.

14. A method of manufacturing a reflector assembly, the method comprising:
   providing a reflector with a continuous reflecting surface and a focusing shape and a plurality of trusses arranged to support the reflector;
   coating the reflecting surface with a reflective coating;
   attaching a plurality of actuators to the plurality of trusses so actuation of one or more of the plurality of actuators exerts a force on the plurality of trusses and the force on the plurality of trusses flexes at least a portion of the continuous reflecting surface; and
   operatively connecting a controller system to the plurality of actuators, the control system configured to control the plurality of actuators;
   operatively connecting a temperature sensor to the controller system to allow for temperature inputs to the controller system so the reflector stays in tolerance though changing temperature; and operatively connecting a humidity sensor to the controller system to allow for humidity inputs to the controller system so the reflector stays in tolerance though changing humidity.

15. The method of claim 14 further comprising polishing the continuous reflecting surface of the reflector.

16. The method of claim 14 wherein the coating is performed using one of a set consisting of electro plating, electroless plating, thermal spraying, direct printing, microdispensing, ink jetting, aerosol spraying, and painting.

17. A reflector assembly comprising:
- a monolithic and adaptive reflector having a single and continuous reflecting surface and a focusing shape;
- a plurality of trusses arranged to provide a supporting structure for the monolithic and adaptive reflector and operatively connected thereto;
- a plurality of motors, each of the plurality of motors attached to one of the plurality of trusses;
- wherein actuation of each of the plurality of motors exerts a force which moves a corresponding one of the plurality of trusses and thereby flexes at least a portion of the continuous reflecting surface so a first of the plurality of motors moves a first of the plurality of trusses and a corresponding first area of the continuous reflecting surface, a second of the plurality of motors moves a second of the plurality of trusses and a corresponding second area of the continuous reflecting surface, and a third of the plurality of motors moves a third of the plurality of trusses and a corresponding third area of the continuous reflecting surface;
- a controller operatively connected to each of the plurality of motors;
- a plurality of temperature and humidity sensors operatively connected to the controller, each of the temperature and humidity sensors associated with one of the first area of the continuous reflecting surface, the second area of the continuous reflecting surface, and the third area of the continuous reflecting surface wherein the controller is configured to control the plurality of motors so the reflector stays in tolerance through changing temperature and humidity; and
- a plurality of optical sensors operatively coupled to the controller to scan distance, shape, or optical fringes utilizing interferometric approaches wherein the controller is configured to control the plurality of motors so the reflector stays in tolerance through optically sensed changes.

* * * * *

UNITED STATES PATENT AND TRADEMARK OFFICE
CERTIFICATE OF CORRECTION

PATENT NO. : 10,241,321 B1
APPLICATION NO. : 15/147714
DATED : March 26, 2019
INVENTOR(S) : Kenneth H. Church et al.

Page 1 of 1

It is certified that error appears in the above-identified patent and that said Letters Patent is hereby corrected as shown below:

In the Claims

Column 5, Claim 14, Line 2, change "though" to --through--

Column 5, Claim 14, Line 5, change "though" to --through--

Signed and Sealed this
Thirtieth Day of April, 2019

Andrei Iancu
*Director of the United States Patent and Trademark Office*